March 16, 1943.    B. E. WILLIAMS ET AL    2,314,300
CHILLING MEAT
Filed March 2, 1940

Beverly E. Williams
and Leon L. Cadwell
INVENTOR
BY Robyn Wilcox
ATTORNEY

ATTEST-
Wm. C. Meiser

Patented Mar. 16, 1943

2,314,300

UNITED STATES PATENT OFFICE 2,314,300

CHILLING MEAT

Beverly E. Williams and Leon L. Cadwell, Chicago, Ill., assignors to Industrial Patents Corporation, Chicago, Ill., a corporation of Delaware Application March 2, 1940, Serial No. 321,832

4 Claims. (Cl. 99—174)

This invention relates to the chilling of meat.

One of the objects of the invention is to provide an improved method for chilling meat.

Another object of the invention is to provide a method whereby meat may be aged and tenderized in a more rapid manner than formerly.

Other objects of the invention will be apparent from the description and claims which follow.

In the preparation of meat for market, animal carcasses, particularly beef and to a lesser extent, lamb, are sometimes "aged" to increase the tenderness and improve the flavor of the meat. In aging and tenderizing meat, such as beef, it is customary to remove the carcass from the killing floor, and place it immediately in a refrigerated room in which the temperature is maintained uniformly at a temperature of approximately 32 to 34 degrees F. The chilled meat is ordinarily held in the open in such a refrigerated room. After a period of time in the refrigerated room, approximately three weeks in the case of beef, the meat has become noticeably more tender through enzymatic action and the flavor has been improved. During the tendering or aging process, the temperature must be carefully controlled because if it is permitted to drop too low, the enzymatic action stops, which prevents the aging, and if the temperature is too high, putrefaction is apt to set in. It is also necessary to carefully control humidity as a high relative humidity promotes the growth of mold on the surface of the lean portions of the meat, which involves trimming that portion of the carcass with consequent trimming loss. On the other hand, if the atmosphere is relatively dry, dehydration occurs which also results in considerable loss. While it has been known that a relative warm moist atmosphere hastened the tenderizing process, meat packers have been forced to hold meat at a temperature just above freezing to avoid putrefaction.

We have discovered that if the meat is enclosed in an insulating bag before placing in the refrigerated room, the meat is aged and tendered within a few days, instead of weeks, as in the old method. The question of time necessary for aging meat is of great importance to the meat industry, producer and consumer as well as the packer. The aging of meat under the old process was very expensive because of the large plants necessary for storing meat during the aging process, and because of the waste involved. Aged meat was, therefore, beyond the resources of most consumers. Failure to age meat resulted in lower prices to producers of meat animals, because most meat is too tough to command the prices of better grades, although such meat, if properly aged, can be made just as tender as the latter.

The preferred method of carrying out the present invention will be understood by reference to the drawings, in which like reference characters indicate similar elements in the respective figures.

Figure 1:
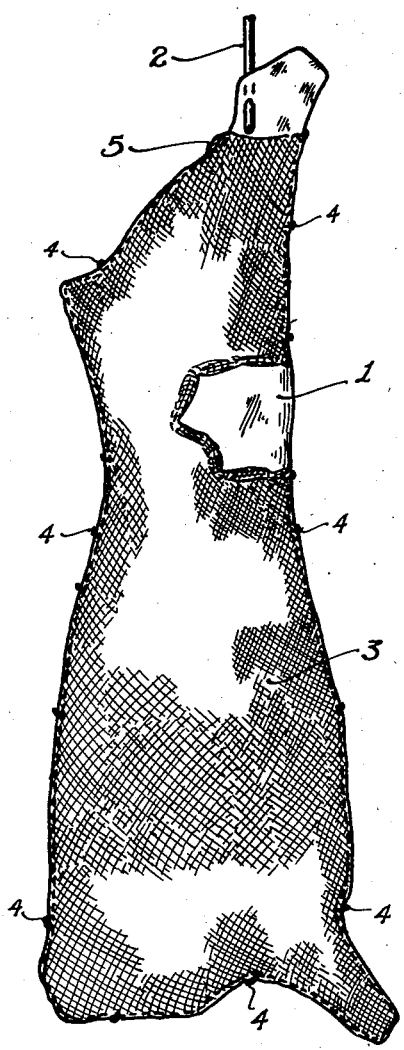
Figure 1 is a side view of a side of beef clothed as in the present invention.
Figure 2:
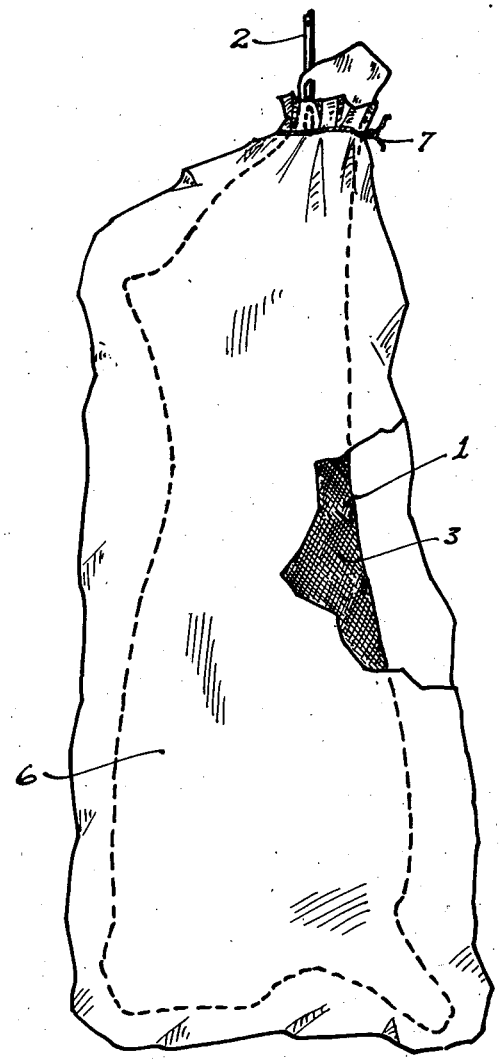
Figure 2 is a side view of a side of beef shown in Figure 1 which has been further encased in an insulating bag in accordance with the present invention.

In carrying out the present invention the eviscerated carcass 1, such as beef carcass from which the hide or pelt is removed, is preferably suspended by the gambrel cords on suitable suspension means, such as 2. The carcass is then preferably wrapped with a cloth 3 which has been moistened with a salt solution. The cloth 3 is preferably a single piece of muslin or beef sheeting, which before application to the carcass is moistened with sodium chloride water solution of 5 degrees to 20 degrees salometer reading strength. This cloth should be only slightly moistened, a satisfactory method being to soak the cloth in the salt solution and then putting it through a wringer. The cloth is tightly and smoothly applied to the skinned surfaces of the carcass, and fastened by any suitable means, such as pins, sewed string stitches, or string ties. In the example shown in the drawing, the cloth is held in place by stitches 4, and self-binding tucks 5 at the knees. Immediately after covering the carcass with the cloth 3, the carcass is encased in a relatively large and stiff insulating bag 6 which is closed at the sides and at one end. The bag 6 may be made of heavy waxed paper or other relatively thin, but stiff, insulating material. The bag is pulled over the carcass and fastened in place by a string tie 1 at each of the knee joints of the hind legs as shown in Figure 2.

After the carcass is encased in the bag 6, a complete enclosure of the bag is effected by folding the top of the bag between the hind legs, or other suitable method. The carcass is removed to the usual refrigeration chamber which may be held at a uniform temperature of 32 to 34 degrees F. where the carcass may be allowed to remain for several days.

The slightly saline moistened cloth prevents the growth of mold on the surface of the meat and retards putrefaction which is due to bacterial action on the surface. The insulating wrapper or bag prevents the rapid chilling of the carcass which is now the accepted procedure in aging meat. Chilling is further retarded by the stiff insulating bag acting to form a quiet pocket of air about the carcass, thereby creating a veritable "furred wall." Retarding chilling, although for only a few hours, after slaughter has been found to rapidly tenderize meat. This can be accomplished safely with the present invention.

Many tests of the effectiveness of the present invention have been made. It has been found that meat carcasses treated in accordance with the present invention may be subsequently chilled and held for protracted periods of time, and shipped long distances the same as other animal carcasses which are chilled in the usual manner. It has also been found that the appearance of the carcass is fully as satisfactory as that chilled in the ordinary method. Furthermore, it has been found that meat treated by the present method becomes tender much more rapidly than meat chilled in the usual manner.

We claim:

1. The method of treating beef and lamb carcasses to obtain improved flavor and tenderness which comprises skinning the carcass, promptly applying a brine moistened cloth to the freshly skinned surface of the meat, then applying to the warm clothed carcass an insulating bag before substantial dissipation of the animal heat has occurred, and subjecting the clothed and insulater carcass to a refrigerated atmosphere whereby delayed and uniform cooling is produced.

2. The method of treating beef carcasses and sides thereof which comprises promptly applying a brine moistened cloth to the freshly skinned surface of the meat, immediately applying to the warm clothed carcass an insulating bag to protect the surface of the meat against sudden changes in temperature of the surrounding atmosphere during cooling and dissipating the animal heat, and maintaining said carcass in a refrigeration zone until the carcass is cooled, whereby the meat is slowly chilled and the temperature throughout the body of the meat is maintained more uniform during said chilling than without the use of said insulating covering.

3. The method of treating carcass beef which comprises skinning the carcass, promptly applying to the freshly skinned surface of the meat a brine moistened cloth, immediately applying to the clothed carcass before substantial dissipation of the animal heat an insulating bag to protect the surface of the meat against sudden changes in the temperature of the atmosphere, and then maintaining said carcass in a cooler wherein the animal heat is slowly dissipated and the entire body of the meat is uniformly chilled to produce improved flavor and tenderness.

4. The method of treating beef carcasses which comprises skinning the carcass, applying to the freshly skinned carcass a brine moistened cloth, promptly covering the warm clothed carcass with a heavy insulating paper bag whereby the meat is protected against sudden changes in temperature, transferring the clothed carcass to a cooler wherein the animal heat is slowly dissipated from the carcass and the entire body of the meat is gradually and uniformly cooled to produce improved flavor and tenderness.

BEVERLY E. WILLIAMS.
LEON L. CADWELL.